(No Model.) 2 Sheets—Sheet 1.

F. L. CAPPS.
SPRING MOTOR FOR PHONOGRAPHS, &c.

No. 570,378. Patented Oct. 27, 1896.

Fig. 1ª

WITNESSES: Robert Sollberger, C. B. Pitney

INVENTOR: Frank L. Capps,
BY Drake & C. ATTY'S.

(No Model.) 2 Sheets—Sheet 2.

F. L. CAPPS.
SPRING MOTOR FOR PHONOGRAPHS, &c.

No. 570,378. Patented Oct. 27, 1896.

WITNESSES:
Robert Sollberger
C. B. Pitney

INVENTOR
Frank L. Capps,
BY Drake ATTY'S.

UNITED STATES PATENT OFFICE

FRANK L. CAPPS, OF NEWARK, NEW JERSEY, ASSIGNOR TO THE UNITED STATES PHONOGRAPH COMPANY, OF SAME PLACE.

SPRING-MOTOR FOR PHONOGRAPHS, &c.

SPECIFICATION forming part of Letters Patent No. 570,378, dated October 27, 1896.

Application filed December 20, 1895. Serial No. 572,744. (No model.)

*To all whom it may concern:*

Be it known that I, FRANK L. CAPPS, a citizen of the United States, residing at Newark, in the county of Essex and State of New Jersey, have invented certain new and useful Improvements in Spring-Motors for Phonographs, &c.; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

The object of this invention is to reduce the cost of construction, to provide a motor for phonographs which will be more convenient for the operator and more effective in producing an even and regular movement, and to secure other advantages and results, some of which will be referred to hereinafter in connection with the description of the working parts.

The invention consists in the improved motor for phonographs, &c., and in the arrangements and combinations of parts, all substantially as will be hereinafter set forth, and finally embraced in the clauses of the claim.

Figure 1:
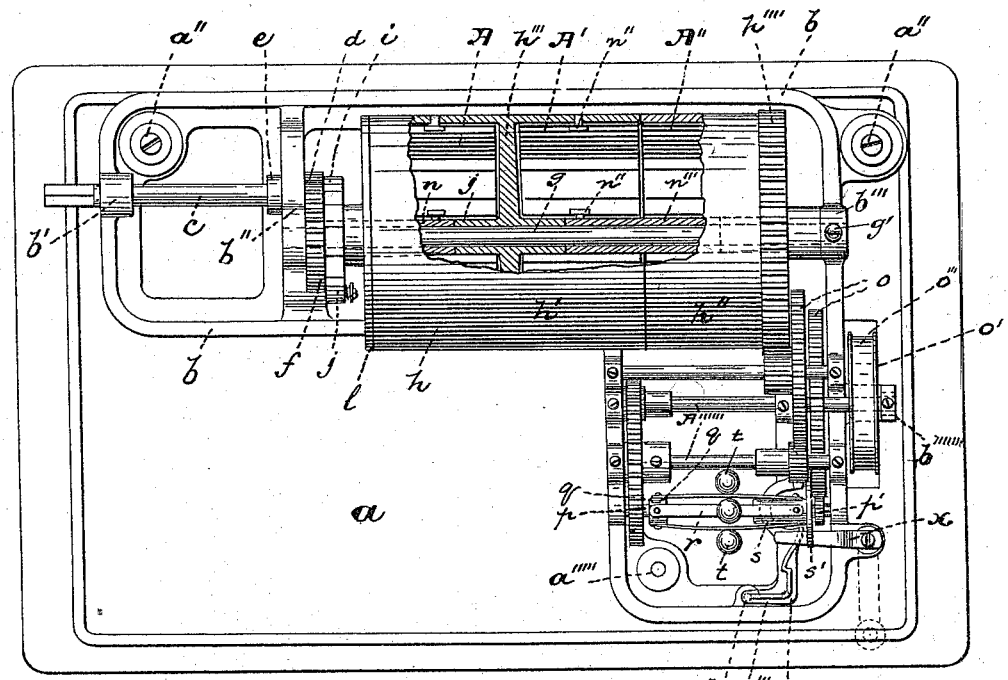
Figure 2:
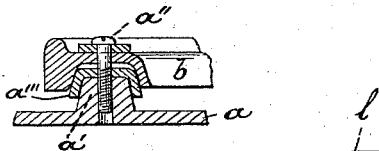
Figure 2:
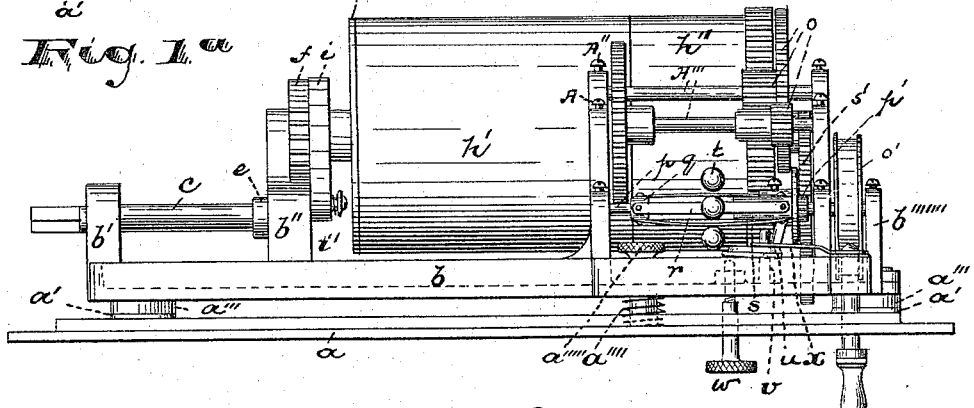
Figure 3:
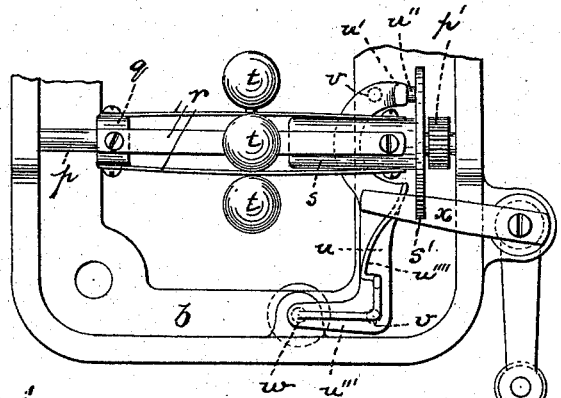
Figure 7:
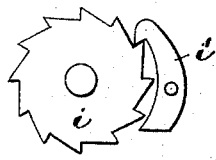
Figure 4:
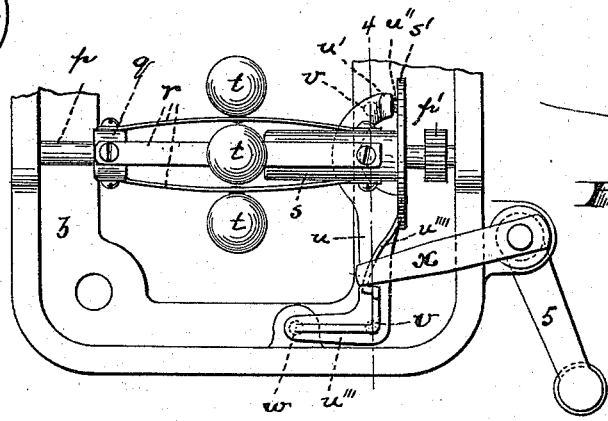
Figure 8:
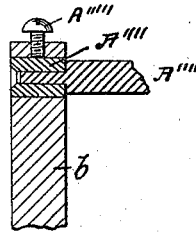
Figures 5, 6:
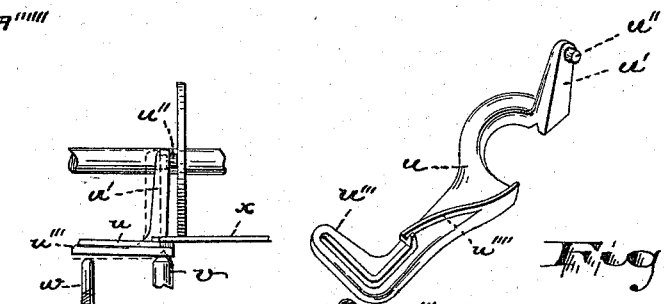
Figure 9:
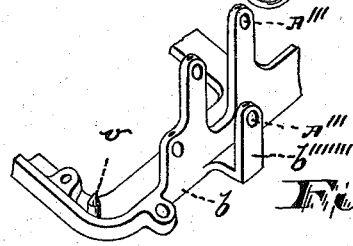

Referring to the accompanying drawings, in which like letters and numerals indicate corresponding parts in each of the several views, Figure 1 is an inverted plan of the improved motor, partly broken away to show the interior construction of a certain spring-containing barrel. Fig. 1ª is a detail section showing the construction of certain bearings for a supplemental plate. Fig. 2 is an inverted front elevation of the motor. Figs. 3 and 4 are detail views illustrating the construction and operation of a governing mechanism. Fig. 5 is a detail elevation of a frictional lever and its coöperating disk; and Fig. 6 is a perspective view, on an enlarged scale, of the lever. Fig. 7 is a detail plan of a certain ratchet-wheel and escapement-pawl. Fig. 8 is a section illustrating the bearings for the arbors of the governor gear-wheels, and Fig. 9 is a detail perspective of the bed-plate.

In said drawings, $a$ indicates a bed-plate adapted to receive on its upper side the phonograph in any suitable and convenient manner. It may be the phonograph-body. On the under side of the said plate the same is provided with rear bearings $a'\,a'$, upon which a supplemental adjustable frame or plate $b$ is secured, said plate $b$ being correspondingly socketed, as shown in Fig. 1ª, and rubber blocks or washers $a'''$ being interposed between said bearings and the said supplemental frame or plate, admitting of a limited play or hinge action of the said supplemental plate and preventing the transmission of sound from the motor to the phonograph. At its forward side a spiral spring $a''''$ is interposed between the bed-plate and the said supplemental frame or plate, said spring serving to hold said plates normally apart with an elastic pressure, but easily giving to the adjusting-screw $a'''''$ when adjusting the motor to the phonograph and tightening or loosening the driving-belt $o'''$, which transmits power and motion from the said motor to said phonograph. The said frame or plate $b$ is in plan of an L shape in general outline and is loosely held on its cushioned rear bearings by screws $a''$ and at the front by the adjusting-screw above referred to. It is preferably of a single casting. On the under side it is provided with integral downwardly-projecting hangers, as indicated clearly in Fig. 9, for the train of governor-gearing and coöperating motive devices. To secure a more smooth and even movement, attain greater durability, and to enable the arbors of the gear-wheels to be more readily placed in position, I form in said hangers holes $A'''\,A'''$, larger in diameter than the arbor, and into said holes are fitted bushings $A''''$, Fig. 8, of hardened steel. These are held in place after adjusting the arbors therein by set-screw $A'''''$.

Upon the longer arm of the L-shaped frame or plate $b$, at the rear of the same, are formed hangers $b'\,b''$, and in the same is pivoted a winding-arbor $c$. This latter is held in place, so as to prevent longitudinal movement, by a pinion $d$ at one side of the hangers $b''$ and a collar $e$ at the other. The outer extremity of the said winding-arbor is angular, made to receive a winding-crank in any ordinary manner.

The cog-wheel or pinion $d$ of the winding shaft or arbor meshes with a cog-wheel $f$, carried by a shaft $g$, extending from the hanger $b''$ to another hanger $b'''$ of the supplemental plate $b$ at the opposite end of the spring-barrel $h$. The said shaft $g$ is fixed in its bearings by a set-screw $g'$, or in any suitable manner, and upon the said shaft the spring attachments, including the cog-wheel $f$ and parts hereinafter to be referred to, revolve loosely.

To the cog-wheel $f$ is rigidly connected a ratchet-wheel $i$, adapted, in coöperation with an escapement-pawl $i$ on the plate $b$, to prevent back movement of said cog-wheel and to maintain the spring in its wound condition. By employing an escapement-pawl rather than a spring-pawl I avoid the noise due to the spring bearing positively on the ratchet $o$. The barrel $h$ is preferably in sections, and three springs are employed, as in the construction shown.

The section $h'$ contains interiorly a diaphragm or web $h'''$, having at the axial center of the barrel a hub $j$, through which the shaft $g$ extends, the hub holding the barrel-section $h'$ so that it will have regular and even movement on said shaft $g$. At the side of the ratchet-wheel $i$, between it and the end of the barrel, a barrel end piece or head $l$ may be employed to prevent the entrance of dust to the spring-chamber and to prevent the spring A from working laterally outward and interfering with the bearings of the ratchet-wheel. On opposite sides of the said web of the section $h'$ are arranged springs A A', one of which springs is fastened to the sleeve or hub-like extension $n$ of the ratchet-wheel $i$. The second spring A', on the opposite side of the web from that first referred to, is also fastened to a sleeve at its inner end, which sleeve is also loosely arranged on the shaft $g$ and extends laterally from the barrel-section $h'$ into the second barrel-section $h''$, where it receives a third spring A''. The sleeves and barrel-sections are provided with buttons, such as $n''$, on which the perforated ends of the springs are removably secured.

The first two springs A A' are each attached at their outer ends to the barrel-section $h'$. The third spring A'' is in like manner attached to the section $h''$ at its outer end. The springs in the section $h'$ are wound oppositely, so that the power of one spring will communicate its power to the other. The inner ends of the springs A' A'' are secured to the loose sleeve $n'''$.

At the periphery of the barrel-section $h''$ the same is provided with a cogged surface $h''''$, by which movement is transmitted from said barrel-section to a train of gearing $o$, having bearings in the hangers of the shorter branch of the L-shaped supplemental frame, as above referred to, and by which power is transmitted to a driving-wheel $o'$, the said driving-wheel being preferably adapted to receive a belt $o'''$ to convey power to the phonograph. The said driving-wheel is arranged on an outside bracket or extension $b''''''$ of the frame, as indicated in Fig. 9, so that the belt can be conveniently detached from or applied to the motor without disarranging the adjustment of the working parts. In train with the said gearing $o$ is arranged a governor of peculiar construction for regulating and controlling the movements of said parts. The said governor consists, preferably, of the parts shown in detail in Figs. 3, 4, 5, and 6, where $p$ indicates the shaft receiving power by means of the cog-wheel $p'$ from the train of gearing $o$ and spring motive devices. $q$ is a collar fixed to said shaft $p$, and $r$ $r$ are springs fastened upon said collar and extending substantially parallel with said shaft $p$ to a loose collar $s$, movable longitudinally on said shaft $p$. The said springs $r$ are provided at their centers with weights $t$, which tend to bow the springs outward as centrifugal force is exerted, the bowing increasing or diminishing in accordance with the increasing or diminishing speed of rotary movement. The bowing of the springs produces a corresponding longitudinal movement of the sliding sleeve or collar $s$, as will be evident. Upon said sleeve or collar $s$ is formed or secured a frictional disk $s'$, adapted to engage an arm of a frictional rocking or canting lever $u$, seated on bearings of the supplemental bed-plate and having an irregular shape. The said lever $u$ is preferably fulcrumed upon two pointed lugs $v$ $v$, Figs. 3, 4, and 5, formed upon and extending up a short distance from the supplemental plate, so that when said lever is turned to one side or the other of said fulcrumal lugs it will be stopped and held at an inclination by the adjusting-screw $w$ in said supplemental plate. Said lever is provided with an arm $u'$ to engage the frictional disk or flange $s'$, the said arm being provided with a cushion-like bearing $u''$, preferably of leather, to provide a proper and effective frictional contact. The said supplemental plate, as above intimated, is provided with an adjusting-screw $w$, and the lever $u$ with an arm $u'''$ to engage the same and control the movements of the frictional lever, limiting its movements and thereby regulating and controlling the speed of the motor. The said lever is held in its fulcrumal bearing $v$ $v$ by a spring-arm $x$, which bears on a curved ridge $u''''$, said ridge at its line of greatest projection crossing the axis or fulcrumal line indicated by the line, Fig. 4, on which the latter vibrates. The spring $x$ operates in connection with a hand-lever 5, by turning which latter the spring is caused to move over said ridge or rib of the lever from one end to the other, so that it will bear upon the opposite side of the fulcrumal line from what it did before turning, and thus cause the arm $u'$ to oscillate from or toward the disk $s'$, as will be understood.

When the spring $x$ bears on the lever at the side of the axial line 4 toward the disk $s'$, as shown in Fig. 3, the said lever at its point of frictional bearing $u''$ engages the side of the disk and causes such a hard pressure upon it as to cause the motor mechanism to stop operations. When turned to the second position, as shown in Fig. 4, the bearing $u''$ will be entirely disconnected from the said disk, and thus the motor devices will be free to operate until a normal speed is reached. A greater speed will cause the weights to be thrown out to such a degree and the springs $r$ to be so flexed as that the disk $s'$ will be drawn into frictional contact with the said arm $u'$, and the speed of said disk and the parts to which it is attached will be brought back to the normal speed desired. By adjusting the lever by means of the screw $w$ the normal speed may be increased or diminished at will.

The construction thus described provides a convenient and easily-operable means of controlling the motor, is of small cost, and is consequently a desirable and advantageous device.

The operation of the invention, it is thought, has been sufficiently described, and a further description is deemed to be of no advantage to a full and clear understanding of the invention by one skilled in the art and would only tend to prolixity.

Having thus described the invention, what I claim as new is—

1. A speed-governor for motors, comprising a shaft which is driven by the motor, a disk or flange rotating with said shaft, centrifugal devices for moving said disk or flange laterally, a brake device with which said disk or flange engages, means for adjusting the position of the brake device whereby the disk or flange may be moved into frictional engagement therewith at varying rates of speed produced by the centrifugal devices, and independent means for moving said brake device into engagement with said disk or flange with sufficient friction to prevent rotation thereof, substantially as set forth.

2. A speed-governor for motors, comprising a shaft which is driven by the motor, a sleeve rotating with but movable laterally on said shaft, a disk or flange carried by said sleeve, centrifugal devices for moving said sleeve laterally, a brake device with which said disk or flange engages, means for adjusting the position of the brake device, whereby the disk or flange may be moved into frictional engagement therewith at varying speeds produced by the centrifugal devices, and independent means for moving said brake device into contact with said disk or flange with sufficient friction to prevent rotation thereof, substantially as set forth.

3. In a motor for operating phonographs, the combination of a bed-plate adapted to receive the phonograph, a frame beneath said plate and supported therefrom, a motor and speed-governing device carried on said frame, an adjusting-screw for regulating said speed-governing device, said screw passing through an opening in said plate, a belt-wheel for said motor to which power is applied, said belt-wheel being adapted to receive the belt to the phonograph, and means for adjusting said frame in its relation to said bed-plate, whereby said belt may be tightened or loosened, substantially as set forth.

4. In a motor for operating phonographs, the combination of the bed-plate to receive the phonograph, a frame beneath said bed-plate and supported therefrom, a motor and speed-governing device carried on said frame, an adjusting-screw for regulating the speed-governing device, a controlling-arm for stopping and starting the motor, said screw and said arm passing through openings in said plate, a belt-wheel for said motor to which power is applied, said belt-wheel being adapted to receive the belt to the phonograph, and means for adjusting said frame in its relation to said bed-plate, whereby said belt may be tightened or loosened, substantially as set forth.

5. In a motor, the combination with the sliding flange or disk and centrifugal means for operating the same, of a bed-plate, a lever pivotally mounted on said bed-plate and adapted to cant to one side or the other of its pivot-point, and having a frictional arm to engage the said disk or flange, and means for holding said lever in either of its canting positions to throw the arm to or from frictional relation to the disk or flange, substantially as set forth.

6. In a motor, the combination with the sliding flange or disk and centrifugal means for operating the same, of a bed-plate, a lever pivotally mounted on said bed-plate, and having a frictional arm to engage the said disk or flange, and a spring engaging said lever and adapted to cant the same to one side or the other of its pivot-point, substantially as set forth.

7. In a motor, the combination with the sliding flange or disk and centrifugal means for operating the same, of a bed-plate, a lever pivotally mounted on said bed-plate, and having an arm to engage said flange or disk, and an adjustable spring adapted to force said lever so that it will change its direction of inclination and cant to one side or the other of its pivot-point, and a finger-piece for operating said spring, substantially as set forth.

8. The improved spring-motor, comprising a bed-plate, springs and means for transmitting movement from said springs, and a governor comprising a shaft receiving power from said springs, a disk or flange sliding on said shaft, centrifugal devices governing the sliding movement of said disk or flange, a lever having an arm movable from or toward the side of the said flange or disk, an adjusting-screw, and a hand-operable spring adapted to be adjusted in its relation to said lever to bear on said lever at one side of the fulcrum thereof, or the other, all of said parts being arranged and adapted to operate, substantially as and for the purposes set forth.

9. The improved spring-motor, comprising a bed-plate, springs, means for transmitting motion from said springs, and a governor comprising a shaft, springs rotating therewith, weights on said springs, a sliding flange or disk, an adjustable lever having a friction-arm, and a spring pivoted upon the bed-plate and adjustably arranged with relation to said lever, whereby said spring may press upon said lever upon either side of the fulcrum, all of said parts being arranged and combined, substantially as and for the purposes set forth.

10. In a spring-motor, the governor having a laterally-movable disk or flange, and a pivoted friction-lever having a ridge or bearing across the axial line, and a spring adapted to slide on said ridge or bearing to throw said lever to or from frictional relation to said disk or flange, substantially as set forth.

11. In a spring-motor, the governor having a laterally-moving disk or flange, operable under centrifugal force, a friction-lever having a ridge or bearing across the axial or fulcrumal line of said lever, a pivoted spring, and a finger-piece for operating said spring, substantially as set forth.

12. In a spring-motor, the governor having a laterally-moving disk or flange, a lever pivotally mounted adjacent to said disk or flange, a friction-arm carried by said lever near one end for engaging said disk or flange, an arm secured to said lever near its other end, and an adjusting-screw coöperating with the last-mentioned arm for regulating the lever and moving the friction-arm toward and away from said disk or flange, substantially as set forth.

13. In a spring-motor, the governor having a laterally-moving disk or flange, a friction-lever having a rib $u'''$ and arms $u'$, $u''''$, an adjusting-screw $w$, and an arm $x$, and a finger-piece 5 for turning said arm $x$ in its relation to said lever, substantially as set forth.

14. In a spring-motor, the governing-lever having a frictional arm, an arm to receive an adjusting-screw, a ridge across the fulcrumal line of said lever, in combination with said adjusting-screw, a spring-arm adapted to be adjusted in its relation to said ridge, and governing devices adapted to receive said frictional arm, substantially as set forth.

15. In a spring-motor, the combination with the centrifugal device, of a bed-plate having two bearings, a lever fulcrumed thereon and having a ridge or bearing crossing the fulcrumal line of the bearings for the lever, an arm at one end of said lever engaging or adapted to engage said centrifugal device, and control its rotary movement, an arm at the other end of said lever, an adjusting-screw coöperating with the last-mentioned arm, a spring-arm coöperating with said ridge or bearing, and a finger-piece for operating the same, substantially as and for the purposes set forth.

16. In a motor, the combination with the sliding flange or disk and centrifugal means for operating the same, of a bed-plate having fulcrumal projections, a lever seated on said projections and adapted to cant to one side or the other of the same and having a frictional arm to engage the said disk or flange, and means for holding said lever in either of its canting positions and throw the arm to or from frictional relation to the disk or flange, substantially as set forth.

17. In a motor, the combination with the sliding flange or disk, and centrifugal means for operating the same, of a bed-plate having a fulcrum, a lever seated on said fulcrum and having a frictional arm to engage the said disk or flange, and a spring holding said lever on said fulcrum and adapted to cant said lever to one side or the other of the same, substantially as set forth.

18. In a motor, the combination with the sliding flange or disk and centrifugal means for operating the same, of a bed-plate having a fulcrum, a lever seated on said fulcrum, and having an arm to engage said flange or disk, and an adjustable spring adapted to force said lever so that it will change its direction of inclination and cant to one side or the other of said fulcrum, and a finger-piece for operating said spring, substantially as set forth.

19. The improved phonograph-motor herein described, comprising a bed-plate adapted to receive the phonograph, an integral frame hinged upon said bed-plate and having a limited movement thereon, said frame having hangers, motive devices arranged on said hangers and having a belt-wheel which is adapted to receive the belt to the phonograph, a governor for controlling or regulating the movements of the motor and phonograph, and means for adjusting said frame in its relation to the bed-plate, whereby said belt may be tightened or loosened at will, said parts being combined, substantially as set forth.

20. The improved phonograph-motor comprising a bed-plate adapted to receive the phonograph, an adjustable frame hinged upon said bed-plate and having a limited movement thereon, motive devices supported on said frame and having a belt-wheel adapted to receive the belt which communicates power to the phonograph, a governor also carried by said frame, an adjusting screw or device, and elastic springs or cushions disposed between the frame and bed-plate, said parts being combined, substantially as set forth.

21. The combination with a phonograph bed-plate, of a supplemental plate having a hinge-like movement, cushions being interposed between said plates, motive devices and a governor, and means for adjusting said plates and thus tightening or loosening the belt conveying power from the motor to the phonograph, substantially as set forth.

22. The improved phonograph-motor herein described, comprising a bed-plate, an integral L-shaped frame adjustable in its relation to said plate, interposed cushions and means for adjusting said frame, a spring-barrel arranged on the longer arm of the L-shaped frame, springs and means for winding the same, governing devices arranged on the shorter arm of the frame, gearing for transmitting power from the springs to the governor and phonograph, the said L-shaped frame and the parts supported thereby being all disposed between the plane of the bed-plate, and said parts being all combined, substantially as set forth.

23. The combination of a bed-plate having projecting bearings at the rear, an adjustable frame having corresponding sockets, and interposed elastic cushions, screws holding the parts together and admitting a limited hinge action, means for adjusting said frame in its relation to the bed-plate, motive and governing devices carried by said frame, and means for transmitting power adjustable with said frame, substantially as set forth.

In testimony that I claim the foregoing I have hereunto set my hand this 29th day of November, 1895.

FRANK L. CAPPS.

Witnesses:
CHARLES H. PELL,
C. B. PITNEY.